United States Patent
Bandyopadhyay et al.

(10) Patent No.: US 9,507,548 B2
(45) Date of Patent: Nov. 29, 2016

(54) METHOD AND APPARATUS FOR PRINT JOB WITH REDUCED MEMORY FOOTPRINT SIZE

(71) Applicants: Aritra Bandyopadhyay, Boulder, CO (US); David Ward, Broomfield, CO (US)

(72) Inventors: Aritra Bandyopadhyay, Boulder, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/485,391

(22) Filed: Sep. 12, 2014

(65) Prior Publication Data

US 2016/0077768 A1    Mar. 17, 2016

(51) Int. Cl.
  *G06F 3/12* (2006.01)
  *G06K 15/00* (2006.01)

(52) U.S. Cl.
  CPC ............ *G06F 3/122* (2013.01); *G06F 3/1244* (2013.01); *G06F 3/1285* (2013.01); *G06K 15/00* (2013.01)

(58) Field of Classification Search
  CPC ..... G06F 3/122; G06F 3/1254; G06F 3/1275
  USPC ........................................................ 358/1.13
  See application file for complete search history.

(56) References Cited

U.S. PATENT DOCUMENTS

| | | | |
|---|---|---|---|
| 5,923,013 A | 7/1999 | Suzuki et al. | |
| 6,549,294 B2 | 4/2003 | Vidyanand | |
| 7,505,172 B2 | 3/2009 | Vondran, Jr. et al. | |
| 7,596,750 B2 | 9/2009 | Inose | |
| 8,520,247 B1 | 8/2013 | Takaishi et al. | |
| 8,553,263 B2 | 10/2013 | Mori | |
| 2005/0094191 A1* | 5/2005 | Vondran et al. | 358/1.15 |
| 2009/0303520 A1 | 12/2009 | Vered | |
| 2010/0328721 A1 | 12/2010 | Ohira | |
| 2011/0170132 A1* | 7/2011 | Mori | G06F 3/1205 358/1.15 |
| 2014/0204424 A1* | 7/2014 | Koutrika | G06K 15/02 358/1.16 |

* cited by examiner

*Primary Examiner* — Saeid Ebrahimi Dehkordy
(74) *Attorney, Agent, or Firm* — Blakely, Sokoloff, Taylor & Zafman LLP

(57) ABSTRACT

A method is described that includes applying a job ticket to a series of pages to produce a next sheet of document to be printed. The method further includes comparing substantive content of the sheet to respective substantive sheet content for a group of one or more previously generated sheets of the document that each contain the respective sheet content. The method further includes referencing the sheet to the group because the substantive content matched the respective substantive sheet content.

20 Claims, 5 Drawing Sheets

PRINTED SIDES PER SHEET

PRINT ORIENTATION (PORTRAIT, LANDSCAPE)

SHEET PLEX

BACK SIDE FIRST MODE

MEDIA (NAME, TYPE, SIZE, COLOR)

INPUT TRAY

OUTPUT BIN

FINISHING INFORMATION

- STAPLE/NO STAPLE
    - PUNCH/NO PUNCH
    - FOLD POLICY
    - STAPLE GROUP START/END

FIG. 3

METHOD AND APPARATUS FOR PRINT JOB WITH REDUCED MEMORY FOOTPRINT SIZE

FIELD OF INVENTION

The field of invention pertains generally to printer technology, and, more specifically, to a method and apparatus for a print job with reduced memory footprint size.

BACKGROUND

A modern day printer is typically connected to multiple client devices (e.g., computers) through a network. The client devices have applications (e.g., word processing applications, spreadsheet applications, graphic art applications, etc.) and (typically) device drivers that enable the work product of the applications to be printed on the printer. The printing of such a work product on a printer typically involves the passing of a "job ticket" from the client device that generates the work product to the printer.

A job ticket is a high level description of the properties of the print out to be made. A job ticket typically defines the number of physical pages to be printed, whether the print out is to be single sided or double sided, the margins on the pages, the font size of the matter that is printed on the pages, the printer tray that the paper the work product is to be printed on is to be selected from, the paper bin that the finished printout is to be binned into and any post-processing procedures (e.g., collation, stapling, etc.). Many job tickets are written according to the Job Definition Format (JDF) standard published by CPI4 (the International Cooperation for the Integration of Processes in Prepress, Press and PostPress Organization). The JDF specification provides for the definition of parameters like those just mentioned above in an XML format.

Modern day printers also include one or more processors and associated memory to store and execute program code locally on the printer. Much of this software is used to control the internal operations of the printer. One such control operation is to produce a "print job" from a job ticket and a series of pages produced, e.g., by the application software that generated the matter to printer (e.g., a word processing application, a spreadsheet application, etc.). A print job is a "sheet-by-sheet" specification of the matter to be printed. A sheet includes a corpus of information used by the printer to print a physical piece of paper according to the job ticket. There is typically one sheet per physical piece of paper that is printed irrespective of whether the piece of paper is printed single sided (e.g., "a page per sheet", multiple pages printed on a single side of paper, etc.) or double-sided ("two pages per sheet", multiple pages printed on each of both sides of a piece of paper, etc.).

Thus whereas a JDF job ticket describes the print out more generally, after the job ticket is applied to the series of pages, a "print-job" that is akin to a collection of data sheets is created that separately defines the characteristics of each of the printed pieces of paper of the document.

For example, if a first chapter of a document is to be printed on yellow paper in 12 point font and a second chapter of a document is to be printed on blue paper in 14 point font, the JDF job ticket might specify the range of the first chapter and that the pages within this range are to be printed from the tray having yellow paper in 12 point font as well as the range of the second chapter and that the pages within this range are to be printed from the tray having blue paper in 14 point font.

When the printer receives the JDF job ticket it essentially forms the print job by applying the JDF job ticket to the series of pages to create a separate sheet for every piece of paper to be printed out and storing these sheets in memory. Thus, there will be stored in memory separate sheets for every page of the first chapter and separate sheets for every page of the second chapter. While the printer is in the act of printing the document, it refers to the sheets (e.g., in sequence) to understand the properties that the corresponding physical pieces of paper are to be printed according to.

FIGURES

A better understanding of the present invention can be obtained from the following detailed description in conjunction with the following drawings, in which:

FIG. 3 shows sheet information;

DETAILED DESCRIPTION

A problem with the construction of a print job from a job ticket and a series of pages as described above in the background section is that the production of a unique sheet for every piece of paper to be printed can consume too much printer memory space, particularly in the case of large printouts. Here, it is pertinent to recognize that each sheet typically contains a complete description/specification of its corresponding piece of paper (e.g., margins, bin, font size, single/double sided, etc.). Recording this much information in memory for every different piece of paper to be printed can easily consume large amounts of memory storage space for large print jobs.

A solution to the problem includes building a different print job data structure arrangement that the printer can still use for its "per piece of paper" print instructions, yet, at the same time, consumes much less memory space within the printer than the prior art print job. In alternate or additional embodiments, the new structure should also be able to be queried and/or editable (e.g., through a user interface and/or formatting structure designed to provide for ease of querying and/or ease of editing).

Figure 1:
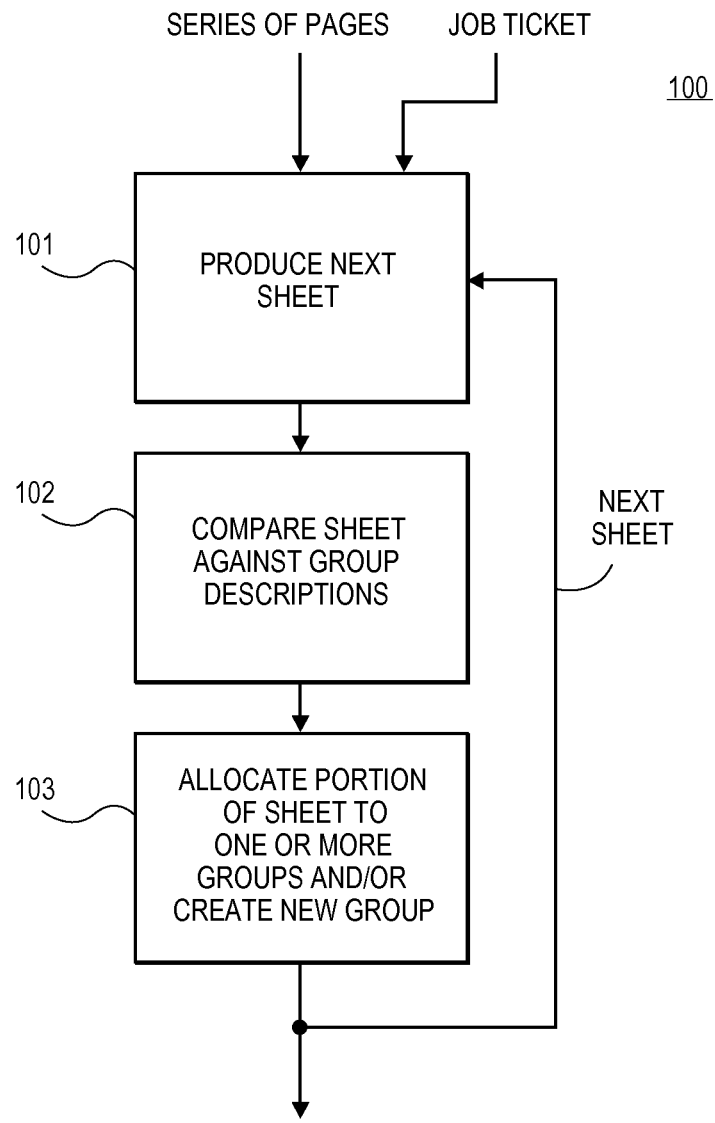
FIG. 1 shows a first print job footprint size reduction process.

FIG. 1 shows a process 100 aimed at producing such a structure. As observed in FIG. 1, a job ticket is applied to a series of pages to produce a next sheet according to the standard prior art process 101. However, rather than simply store the sheet in memory, instead, the sheet is compared against descriptions of sheets that have already been generated and grouped where same content was found 102. If any portion of the sheet matches the content description for an already defined sheet group, the portion is assigned to that group 103.

Depending on the circumstances any of the following may happen: 1) none of the content (no portion) of the new sheet matches any of the content of an already existing group in which case a new group is defined to be the content of the new sheet and the number of the new sheet is referenced only to the new group; 2) one or more subsets (some portion(s)) of the content of the new sheet match the respective content descriptions of one or more existing groups in which case the number of the new sheet is referenced to each of the one or more existing groups; 3) one or more subsets (some portion(s)) of the content of the new sheet do not match any content descriptions of any of the existing groups in which case a new group is defined to be the content of the new sheet without a match to an existing group and the number of the new sheet is referenced to the new group (note that conditions 2) and 3) can exist simultaneously for a same new sheet); 4) the entire content (the entire portion) of the new sheet matches the content description of an existing group in which case the number of the sheet is referenced only to the existing group.

By performing the process 100 for all next sheets of the document that are produced by the application of the job ticket to the series of pages, groups will naturally be formed that identify all the sheets of the document and/or portions thereof that share the same print specification characteristics. For every sheet identified as belonging to a particular group having at least one other sheet, the memory space footprint will be one sheet size smaller as compared to the prior art print job footprint. That is, because the entire sheet group is referenced to only a single stored sheet instance in memory, the single stored sheet instance is reused for every sheet in the group rather than every sheet in the group having its own dedicated sheet instance stored in memory.

In many printed documents the number of sheets having a common set of print specifications may be quite large. For example, recalling the first and second chapter examples in the background, every sheet in the first chapter may belong to a same first sheet group and every sheet in the second chapter may belong to a same second sheet group. As a consequence, continuing with the example, only a single sheet instance needs to be stored in memory for the entire first chapter and only a single sheet instance needs to be stored in memory for the entire second chapter.

Once the series of pages has been has been fully processed such that, e.g., the contents of every resulting sheet has had an opportunity to be checked against the grouped history of the contents of its preceding sheets, the resulting data footprint corresponds to a reduced amount of data having a number of groups of sheets each assigned or otherwise linked/reference to their own corresponding stored single sheet instance.

During the processing of the sheets (e.g., during the printing process), the printer processor progresses through the sheet numbers in sequence. Each piece of paper is printed according to the contents of the stored sheet instance for each group that the piece of paper's sheet is a member of. Depending on design choice, during sequential sheet processing during the print process, the printer processor may scan data structures that correspond to the sheet group definitions and flags the one or more groups that contain the number of the sheet whose corresponding piece of paper it desires to process next. Once the sheet group(s) for the piece of paper's sheet is/are found, the sheet group(s) will contain a reference to its single stored sheet instance. The printer processor then uses the contents of the stored instance(s) to print the piece of paper.

Alternatively, e.g., before printing starts, an array structure or table may be constructed having an entry for each piece of paper in sequence where each entry identifies each piece of paper's corresponding sheet group(s) or even the specific reference(s) to the corresponding stored instance(s) of the sheet group(s). During the actual printing the printer will refer to the array and immediately identify the entry for the piece of paper it is processing which in turn will identify the piece of paper's one or more sheet group(s) and/or the corresponding stored instance(s) of the one or more sheet group(s). Note that in order to effect the data footprint reduction it is assumed a number of pieces of paper that are reflected in the array will identify same group(s)/instance(s) in their corresponding array entry.

Note that the degree to which sheets are deemed to have a same or at least common set of sheet characteristics is a matter of design choice and/or may otherwise vary from embodiment to embodiment. For example, obviously the common set of criteria should not include the actual page number (otherwise all the sheets will be different). Other sheet content items that may be "left out" of consideration of the grouping process includes the actual printed content for the sheet (again, most pages of most documents have different content). Other items that may be generally left out of the comparison process include: actual pages and their positions in a sheet, and the state of each sheet (e.g., printed, dispatched, complete, building, etc.).

Figure 2:
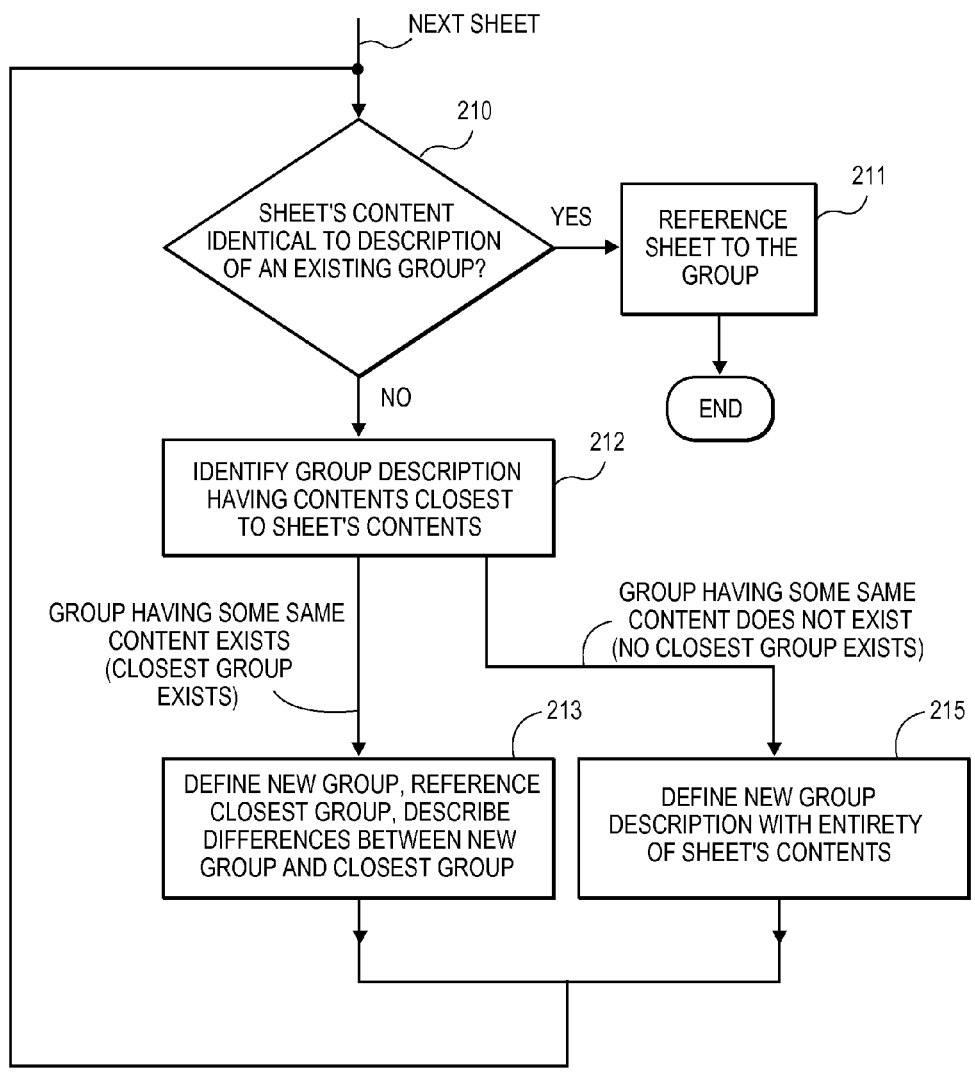
FIG. 2 shows an embodiment of a process for implementing the print job footprint size reduction process.

FIG. 2 shows an embodiment of a process that can be used to implement processes 202 and 203 of FIG. 1. As observed in FIG. 2, upon generation of a next sheet, an inquiry 210 is made to see if the sheet's entire content matches the content of an already defined sheet group. If the sheet's entire content matches the content of an already defined sheet group, the sheet's number is referenced to the sheet group 211. Note that if the sheet is the first sheet to be produced from the series of pages, no groups exist yet and the answer to inquiry 210 is "no".

If the sheet's entire content does not match the content of an existing group, the set of existing groups are analyzed to determine the group whose content is "closest" to the next sheet's content 212. The manner by which "closest" is determined may vary from embodiment to embodiment, but generally, a document comparison algorithm is executed between the newly produced sheet and the documents (sheet instances) that keep the content of their respective groups.

If some portion of the next sheet's content matches the content definition of an existing "closest" group, a new group is created for the next sheet that references the closest group and includes additional meta-data that describes the differences between the content of the closest group and the content of the next sheet. For example, if the next sheet includes all the information of the closest group but also includes additional information that the closest group does not have, the new group for the next sheet will reference the closest group and include the additional information along with an indication that the content of the closest group and the additional information are to be added to obtain the content for the next sheet. A deeper discussion of how groups can be referenced to other groups and include descriptions of their differences is provided in more detail further below.

If no portion of the next sheet's content matches the content of an existing group, a new group is declared having the content of the next sheet 215. Note that in the case of the very first sheet produced for the series of pages the process should flow to process 215. The process then repeats for the next sheet, Thus, by way of the above process multiple pages or portions thereof may be assigned to a same sheet group and the corresponding sheet instance information (in which the group's content is actually kept). Note that sheet instances having their corresponding group's content may be stored in memory on the fly as new groups are declared consistent with the process described above in FIG. 2.

As alluded to above with respect to process 214, the stored sheet instances for the different groups may be structured to "build off" of each other by their relative differences so as to provide for an even smaller memory footprint. For example, if a second stored sheet instance for a second sheet group is defined to include characteristics a,b,c, and a first sheet group is defined to include characteristics a,b,c,d, the second sheet group may reference the first sheet group as "its" stored sheet instance with some additional meta data that it (the second sheet group) does not contain characteristic d. During processing for a piece of paper that is defined by the second sheet group, the printer processor will understand to not include characteristic d for the piece of paper and then use the reference to the stored instance of the first sheet group to obtain characteristics a,b and c for the same piece of paper.

In even further embodiments, "differences" between sheet groups whose stored sheet instances have a referenced relationship may be additive, subtractive or both additive and subtractive. The example discussed immediately above was additive (the property d of the second sheet was added to the properties a,b,c of the first sheet). In the case of an additive relationship, for example, the second sheet group may include properties a,b,c,d,e. As such, the stored instance for the second sheet group contains a reference to the stored sheet instance of the first group having properties a,b,c.d and additional information that property e is to be added to the contents of the first stored sheet instance in order to comprehend the contents of the second sheet group. In the case of relationship that is both additive and subtractive, for example, the second sheet group may have properties a,b,e. As such, the stored sheet instance for the second group may include a reference to the stored sheet instance for the first sheet group having properties a,b,c,d and two additional items of information that indicate item c is to be deleted and item e is to be added to properly interpret the properties of the second sheet group.

The approach described above with respect to FIGS. 1 and 2 attempt to compare the individually produced sheets and group sheets demonstrating common content. By contrast, an alternate embodiment may exist in which the organization/structure of the sheets are broken down into constituent parts and the constituent parts are compared for likeness across the content of the various sheets. Here, each sheet produced by the application of the job ticket to the series of pages may have a common outline or structure, but the definition provided for each outline component may be different across various sheets.

For example, recalling the first and second chapter example discussed in the background, it is clear that each page is described according to paper tray and font size. In the alternate approach a corresponding breakdown is applied to a general sheet definition that describes each sheet according to at least paper tray and font size. Some pages may be selected from the yellow tray while other pages may be selected from the blue tray. Likewise, some pages may have font size 12 while other pages may have font size 14. Regardless, many if not all pages in the document share a common definition list that includes tray and font size.

As such the alternate approach effectively builds schema 202 definitions over course of its observance of the respective schemas of the sheets on the fly as they are produced in sequence from the application of the job ticket to the series of pages. At completion, each of the various schema definitions have specific values for each of their schema components and specific sheet numbers assigned to each of the different values.

For example, consider a simplistic schema that only includes three sheet characteristics: 1) output bin; 2) font; 3) margins. Additionally consider a simple document having 10 sheets whose individual sheets reveal the following characteristics:

1. sheet 1: bin=1; font=12; margins=XxY;
2. sheet 2: bin=1; font=12; margins=XxZ;
3. sheet 3: bin=1; font=14; margins=XxY;
4. sheet 4: bin=2; font=12; margins=XxZ;
5. sheet 5: bin=2; font=16; margins=XxY;
6. sheet 6: bin=1; font=12; margins=XxZ;
7. sheet 7: bin=1; font=12; margins=XxY;
8. sheet 8: bin=1; font=14; margins=XxZ;
9. sheet 9: bin=1; font=12; margins=XxY;
10. sheet 10: bin=1; font=14; margins=XxZ.

From the above, a schema can be structured to define any sheet as follows:
1. bin (1 or 2);
2. font (12, 14 or 16)
3. margins (XxY or XxZ) and the reduced footprint compilation process can then proceed to store the sheet information into memory as follows:
1. bin
bin 1=sheets 1-3, 6-10.
bin 2=sheets 4,5
2. font
12=sheets 1,2,4,6,7,9
14=sheets 3,8
3. margins
XxY=sheets 1,3,5,7,9
XxZ=sheets 2,4,6,8,10

The above filled out schema represents the entire print job and will have a significantly smaller footprint than the individual sheets (a naked eye comparison of the list of sheets against the filled out schema confirms the filled out schema contains a smaller amount of data than the list of sheets).

While the printer is in the process of processing the sheet information it scrolls through the filled-out schema for each sheet of paper on a sheet by sheet basis. For the particular sheet the printer is processing through the schema, the printer will look for a match to the sheet number in each schema component. For example, during the processing for the first sheet, the sheet number (sheet 1) will match on bin 1; font 12 and margin XxY; during the processing of the second sheet, the sheet number (sheet 2) will match on bin 1; font 12 and margin XxZ, etc. Thus, from the filled out schema structure above, the printer will be able to perfectly reconstruct the sheet information that was originally contained in each respective sheet for each separate piece of paper.

Note that the term "substantive content" can be used to refer to "content" as referred to above, e.g., with respect to FIGS. 1*a* and 1*b* or "schema" as referred to above.

The above examples have been simplistic in terms of their description of the content of the sheet. FIG. 3 shows a more expansive list of some of the properties that a sheet may contain. It should be understood that any of the properties listed on FIG. 3 can be used in various combinations to define a set of criteria that sheets having a same set of such criteria are identified as having in common and are therefore assigned to a same group according to the approach depicted in FIG. 1. Additionally, it should be understood that any of the properties listed in FIG. 3 can also be used as a schema component for use in the alternate approach discussed just above. Further still, the properties of FIG. 3 are exemplary and any other property related to a print job may be part of a schema.

An additional point of note is that the job model structures described above not only many typical print jobs to "fit" in memory but also easily lends themselves to searches and editing. As such, a user can easily make changes to a print job. Desiring to make edits to a print job is not uncommon. Here, the print job structures described above can be easily searched (e.g., based on a key word of the content or schema found in the sheet instances of the various groups) to identify one or more sheets having the specific sought for item. Additionally, extracting the complete set of information for any particular sheet is easily accomplished by scrolling through the definitions of the different groups and where the sought for page number is found in a group, fetching that group's sheet instance (and building the sheet from all sheet instances whose groups included the sought for sheet).

Note that a change to any one sheet may cause the sheet to be joined with another group or may cause a new group to be defined entirely. Either way, such changes to the job model can be easily implemented in response to the change. The job model structures discussed above also permit easy viewing/browsing of the print out by a user in any direction. Additionally, apart from easily making edits to a print job and/or viewing/browsing the print job, being able to fit a print job in memory permits for easy suspension and resumption of the print job. For instance in the case where a print job is suspended, the entire print job including processed and non processed sheets may be swapped out of memory. Upon resumption, the entire print job is easily called back into memory starting from the point of the previous suspension.

Figure 4:
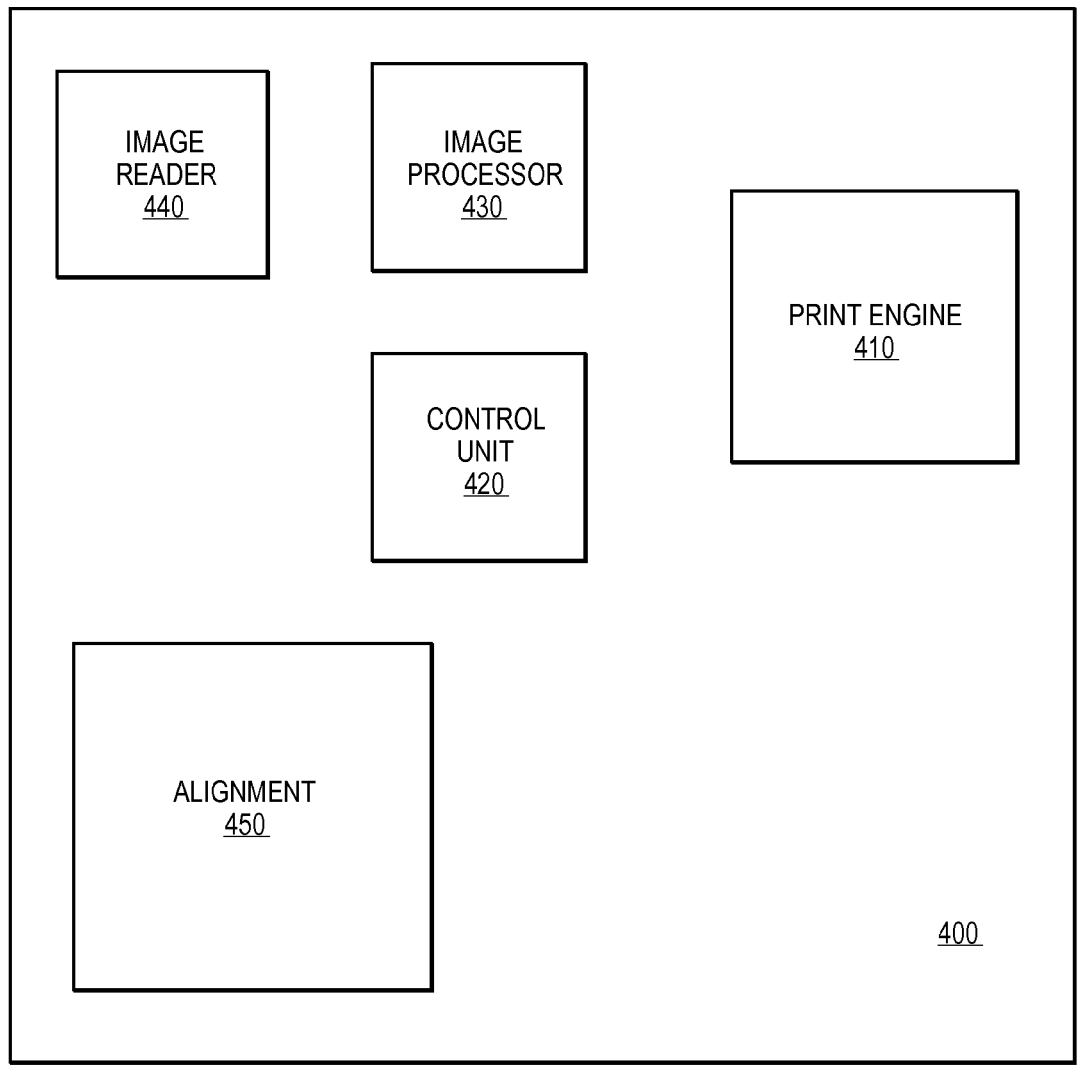
FIG. 4 shows an embodiment of a printer.

FIG. 4 illustrates one embodiment of a printer 400. Printer 400 includes print engine 410, control unit 420, image processor 430, and image reader 440. Print engine 410 includes the print heads that apply ink to a print medium (e.g., paper). In one embodiment, print engine 410 includes at least four print heads arranged in a fixed inkjet print head array. In a further embodiment, print heads associated with a single color are located within the same print head tray. The reduced foot print processes described above may, in various embodiments, be implemented by any of the control unit 420 or image processor 430. The control unit 420 and/or image processor 430 may be implemented, wholly or partially, as a processor or other kind of circuit that executes program code. Memory may be coupled to a processor associated with the control unit 420 and/or a processor associated with the image processor 430. The stored sheet instances may be stored in such memory.

Control unit 420 controls the operation of print engine 410, while image processor 430 performs rasterization of image data received at printer 400. Rasterization converts information received at printer 400 into a raster format. Particularly, image processor 430 generates a raster scan of a received image that is to be stored as scan line data in a memory array. Subsequently, image processor 430 performs halftone processing of the scan line data stored in the memory array. Control unit 420 also verifies the output of print engine 410 upon receiving image data captured by image reader 440.

Printer 400 also includes a print head alignment system 450. Alignment system 450 is implemented to provide an alignment of print engine 410 associated with each individual ink color with respect to a reference position. In a further embodiment, alignment system 450 provides a framework for computing a magnitude of misalignment between print heads in fixed print head array arrangements. Although shown as residing a component of printer 400, other embodiments may feature alignment system 450 as an independent device, or combination of devices, that is communicably coupled to printer 400. Various fixes to problems exhibited by the aforementioned printouts may be addressed via manipulation of the alignment system 450.

Figure 5:
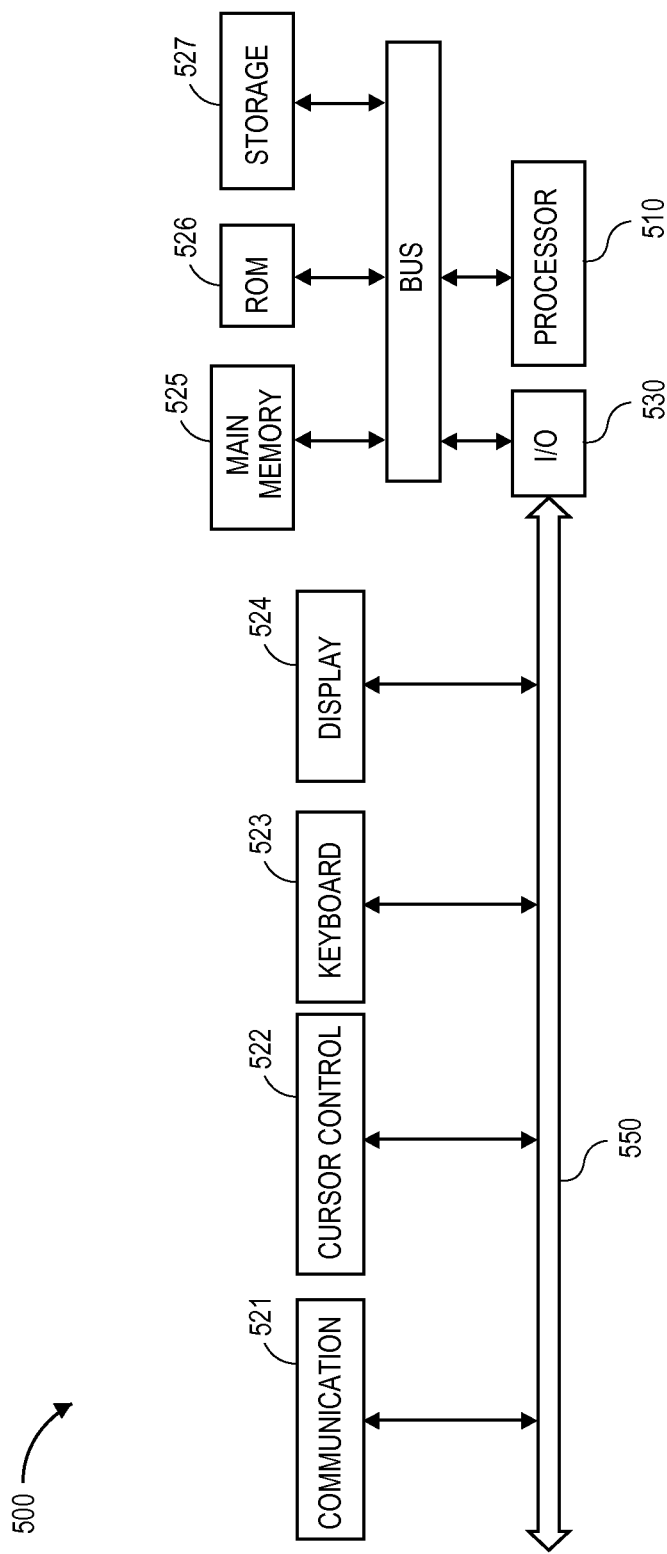
FIG. 5 shows an embodiment of a computing system.

Control unit 420 may be implemented as a form of computing system having a central processing unit and associated system memory and non volatile storage. An exemplary computing system is depicted in FIG. 5. Control unit 420 may include various components of the computing system of FIG. 5.

FIG. 5 illustrates a computer system 500. Computer system 500 may partially or wholly found within, for example, either or both of control unit 520 and image processor 530 of FIG. 5. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions. Program code may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

The invention claimed is:

1. A non-transitory machine readable storage medium containing stored program code that when processed by a processor of a printer causes a method to be performed, comprising:
   applying one or more properties included in a Job Definition Format (JDF) job ticket to a series of pages to produce a sheet of document to be printed;
   comparing a content description of the sheet to sheet content descriptions for one or more groups of one or more previously generated sheets of the document that each contain the respective sheet content; and
   determining that the content description of the sheet matches the sheet content descriptions for the one or more groups;
   referencing the sheet to one or more matching groups upon a determination that the content description of the sheet matches the sheet content descriptions for the one or more groups,
   wherein the content description describes one or more properties of the sheet.

2. The machine readable storage medium of claim 1 wherein the sheet content descriptions further describe schema information of the sheet.

3. The machine readable storage medium of claim 1 wherein the sheet content descriptions further describe less than all of the content description of the sheet.

4. The machine readable storage medium of claim 1 wherein the sheet content descriptions further describe substantially all of the content description of the sheet.

5. The machine readable storage medium of claim 1 wherein the sheet content description is stored in memory and references a sheet content description for another group of sheets of the document to be printed.

6. The machine readable storage medium of claim 5 wherein the reference to the sheet content description for the other group of sheets has associated meta data that includes any of:
   additive information;
   subtractive information.

7. The machine readable storage medium of claim 1 wherein the method further comprises:
   applying the job ticket to the series of pages to produce a second next sheet of document to be printed;
   comparing a content description of the next sheet to the sheet content description for the one or more groups;
   determining that the content description of the next sheet does not match the sheet content description for any of the one or more groups; and
   declaring a new group that includes the content description of the next sheet.

8. The machine readable medium of claim 1 further comprising building the content description of the sheet by scrolling through sheet content descriptions for the one or more groups and fetching sheet content description information for any group that references the sheet.

9. The machine readable storage medium of claim 1 further comprising:
   building the sheet with the matching sheet content description information; and
   printing the sheet of the document.

10. A printer having a processor and non-transitory machine readable storage medium, the machine readable medium having stored program code that when processed by the processor cause the printer to perform a method, comprising:
    applying one or more properties included in a Job Definition Format (JDF) job ticket to a series of pages to produce a sheet of document to be printed;
    comparing a content description of the sheet to sheet content descriptions for one or more groups of one or more previously generated sheets of the document that each contain the respective sheet content; and
    determining that the content description of the sheet matches the sheet content descriptions for the one or more groups;
    referencing the sheet to one or more matching groups upon a determination that the content description of the sheet matches the sheet content descriptions for the one or more groups,
    wherein the content description describes one or more properties of the sheet.

11. The printer of claim 10 wherein the sheet content descriptions further describe schema information of the sheet.

12. The printer of claim 10 wherein the sheet content description is stored in memory and references a sheet content description for another group of sheets of the document to be printed.

13. The printer of claim 10 wherein the method further comprises:
    applying the job ticket to the series of pages to produce a next sheet of document to be printed;
    comparing a content description of the next sheet to the sheet content description for the one or more groups;
    determining that the content description of the next sheet does not match the sheet content description for any of the one or more groups; and
    declaring a new group that includes the content description of the next sheet.

14. The printer of claim 10 wherein the method further comprises building the content description of the sheet by scrolling through sheet content descriptions for the one or more groups and fetching sheet content description information for any group that references the sheet.

15. The printer of claim 10 wherein the method further comprises:
    building the sheet with the matching sheet content description information; and
    printing the sheet of the document.

16. A method, comprising:
    applying one or more properties included in a Job Definition Format (JDF) job ticket to a series of pages to produce a sheet of document to be printed;
    comparing a content description of the sheet to sheet content descriptions for one or more groups of one or more previously generated sheets of the document that each contain the respective sheet content; and
    determining that the content description of the sheet matches the sheet content descriptions for the one or more groups;
    referencing the sheet to one or more matching groups upon a determination that the content description of the sheet matches the sheet content descriptions for the one or more groups,
    wherein the content description describes one or more properties of the sheet.

17. The method of claim 16 wherein the sheet content descriptions further describe schema information of the sheet.

18. The method of claim 16 wherein the sheet content description is stored in memory and references a sheet content description for another group of sheets of the document to be printed.

19. The method of claim 16 wherein the method further comprises:
   applying the job ticket to the series of pages to produce a next sheet of document to be printed;
   comparing a content description of the next sheet to the sheet content description for the one or more groups;
   determining that the content description of the next sheet does not match the sheet content description for any of the one or more groups; and
   declaring a new group that includes the content description of the next sheet.

20. The method of claim 16 further comprising:
   building the sheet with the matching sheet content description information; and
   printing the sheet of the document.

\* \* \* \* \*